United States Patent [19]
Nobayashi et al.

[11] Patent Number: 5,717,583
[45] Date of Patent: Feb. 10, 1998

[54] POWER CONVERTER CONTROL APPARATUS FOR CONTROLLING COMMUTATION OF SWITCHING DEVICES UNDER TRANSIENT CONDITIONS

[75] Inventors: Masamori Nobayashi, Osaka; Koji Yamaji, Kagawa; Kazuo Kato, Tokyo; Naohiro Toki, Hyogo; Shinzo Tamai, Hyogo; Toshiyuki Fujii, Hyogo; Hatsuhiko Naitoh, Hyogo, all of Japan

[73] Assignees: The Kansai Electric Power Co., Inc., Osaka; Shikoku Electric Power Company, Incorporated, Kagawa-ken; Electric Power Development Co., Ltd.; Mitsubishi Denki Kabushiki Kaisha, both of Tokyo, all of Japan

[21] Appl. No.: 510,657

[22] Filed: Aug. 3, 1995

[30] Foreign Application Priority Data

Nov. 2, 1994 [JP] Japan ................................ 6-269730

[51] Int. Cl.⁶ ............................................. H02M 7/515
[52] U.S. Cl. ........................................ 363/96; 363/95
[58] Field of Search ........................... 363/95, 96, 98

[56] References Cited

U.S. PATENT DOCUMENTS

| | | | |
|---|---|---|---|
| 4,665,474 | 5/1987 | Neupauer | 363/35 |
| 4,823,251 | 4/1989 | Kawabata et al. | 363/95 |
| 4,887,200 | 12/1989 | Neupauer | 363/35 |
| 4,908,756 | 3/1990 | Higashino | 363/98 |
| 4,962,339 | 10/1990 | Schauder | 363/58 |
| 5,343,139 | 8/1994 | Gyugyi et al. | 363/39 |
| 5,410,464 | 4/1995 | Yoshino | 363/96 |
| 5,483,140 | 1/1996 | Hess et al. | 363/34 |

FOREIGN PATENT DOCUMENTS

| | | | |
|---|---|---|---|
| 3236071 | 1/1984 | European Pat. Off. | H02J 3/38 |
| 0150370 | 8/1985 | European Pat. Off. | H02M 1/84 |
| 0455181 | 11/1991 | European Pat. Off. | H02M 7/219 |
| 6284731 | 10/1994 | Japan | H02M 7/155 |

OTHER PUBLICATIONS

M. Takasaki et al., "Dynamics of HVDC System under Unbalanced AC Transmission Line Faults and its Stabilization", The Transaction of the Institute of Electrical Engineers of Japan, vol. 112–B, No. 1, Jan. 1992, pp. 27–35.

The Institute of Electrical Engineers of Japan, "DC Electrical Transmission Techniques Commentary" (Mar. 1978), p. 84.

Primary Examiner—Jeffrey L. Sterrett
Attorney, Agent, or Firm—Rothwell, Figg, Ernst & Kurz

[57] ABSTRACT

A power converter controlling apparatus outputs voltage signals different in phase from phases of commutation voltages of each switching device by 90 degrees to transform the voltage signals and the commutation voltages in conformity with polar coordinate transformation, and outputs amplitudes of the commutation voltages and the phase differences of the commutation voltages to a reference phase based on the results of the transformation to operate phase-control angles of each switching device on the amplitudes and the phase differences.

6 Claims, 14 Drawing Sheets

$\alpha_1 = 60°$
$\alpha_2 = 180°$
$\alpha_3 = 300°$

FIG. 13(a)
(PRIOR ART)
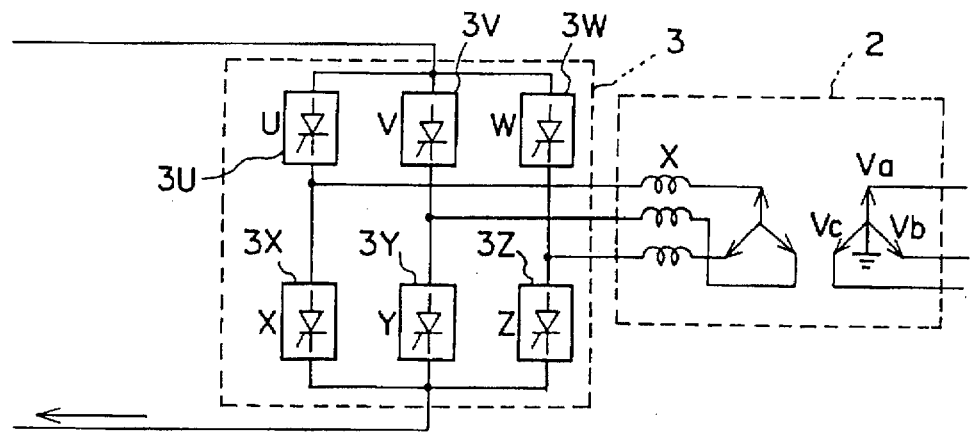
FIG. 13(b)
(PRIOR ART)
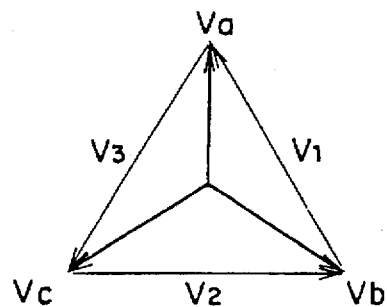
FIG. 13(c)
(PRIOR ART)
| COMMUTATION VOLTAGE FROM U TO V | $Va-Vb=V_1$ |
| --- | --- |
| COMMUTATION VOLTAGE FROM V TO W | $Vb-Vc=V_2$ |
| COMMUTATION VOLTAGE FROM W TO U | $Vc-Va=V_3$ |
| COMMUTATION VOLTAGE FROM X TO Y | $Vb-Va=-V_1$ |
| COMMUTATION VOLTAGE FROM Y TO Z | $Vc-Vb=-V_2$ |
| COMMUTATION VOLTAGE FROM Z TO X | $Va-Vc=-V_3$ |

POWER CONVERTER CONTROL APPARATUS FOR CONTROLLING COMMUTATION OF SWITCHING DEVICES UNDER TRANSIENT CONDITIONS

BACKGROUND OF THE INVENTION

1. Field of the invention

The present invention relates to a power converter controlling apparatus which prevents the failure of commutation in a power converter to transmit appropriate electric power when an ac voltage of an electric power system change.

2. Description of the Prior Art

FIG. 12 is a block diagram showing a conventional power converter controlling apparatus. In FIG. 12, reference numeral 1 designates an ac transmission line; numeral 2 designates a transformer; numeral 3 designates a power converter connected to the ac transmission line 1 through the transformer 2 for converting dc electric power to ac electric power; numeral 4 designates a transmission line connected to dc terminals of the power converter 3; and numeral 5 designates a current transformer for detecting a dc current Id in the transmission line 4.

Reference numeral 6 designates an averaged ac voltage detector for detecting the amplitudes of each phase ac voltage in the ac transmission line 1 and outputting an averaged value E of each phase amplitude; numeral 7 designates a phase-control angle outputting means for operating a phase-control angle a based on the averaged value E outputted by the averaged ac voltage detector 6 and on a dc current Id detected by the current transformer 5; and numeral 8 designates a controlling means generating an ignition pulse when a triangular wave synchronized with a phase of a commutation voltage becomes the same as a phase-control angle a outputted by the phase-control angle operating means 7 for controlling each switching device constituting the power converter 3.

FIG. 13(a) is a network diagram showing the connection of the power converter 3 with the transformer 2. In FIG. 13(a), reference numerals 3U, 3V, 3W, 3X, 3Y and 3Z designate switching devices in the U-phase, the V-phase, the W-phase, the X-phase, the Y-phase and the Z-phase of the power converter 3 respectively; reference mark X designates commutation reactance for one phase of the transformer 2; and marks Va, Vb and Vc designate phase voltages of the transformer 2. FIG. 13(b) is a vector diagram showing each voltage in the transformer 2, and FIG. 13(c) is a table showing the amplitudes of each commutation voltage. In FIG. 13(b) and FIG. 13(c), reference mark V1 designates a commutation voltage from the U-phase to the V-phase; mark V2 designates a commutation voltage from the V-phase to the W-phase; mark V3 designates a commutation voltage from the W-phase to the U-phase; mark -V1 designates a commutation voltage from the X-phase to the Y-phase; mark -V2 designates a commutation voltage from the Y-phase to the Z-phase; and mark -V3 designates a commutation voltage from the Z-phase to the X-phase.

Next, the operation thereof will be described. The averaged ac voltage detector 6 detects the amplitudes of each phase ac voltage in the ac transmission line 1 and outputs the averaged value E of each phase amplitude. The averaged ac voltage detector 6 ordinarily needs tens of milli-seconds from sampling each phase ac voltage for obtaining the averaged value E. The reason why it takes such a time is that it is required to eliminate higher harmonics which are generally contained in ac voltages besides dc components for obtaining the amplitudes of the ac voltages by using a filter circuit (not shown) which has a phase characteristic delaying ac voltages passing through it. Therefore, it is required to wait the changes of the ac voltages for tens of milli-seconds in accordance with the phase characteristic for obtaining the amplitudes of the ac voltages.

This averaged ac voltage detector 6 is disclosed in, for example, an article entitled "*Dynamics of HVDC System under Unbalanced AC Transmission Line Faults and its Stabilization*", M. Takasaki, et. al. *Denkigakkai Ronbunshi* (T. IEE Japan), Vol. 112–B, No. 1, 1992, pp. 27–34.

When an averaged value E having been outputted by the averaged ac voltage detector 6 and a dc current Id having been detected by the current transformer 5 are input into the phase-control angle operating means 7, the phase-control angle operating means 7 outputs a phase-control angle α in conformity with the following formula.

$$\alpha = \cos^{-1}(\sqrt{2} * X * Id / E - \cos\gamma) \quad (1)$$

where mark γ designates an extinction angle for controlling.

The formula (1) is disclosed in "*Chokuryu Sodengijyutsu Kaisetsu (A Commentary of DC Power Transmission Techniques)*", (Denkigakkai (IEE), Tokyo, 1978), p. 84.

When phase-control angles α1, α2 and α3 having been outputted by the phase-control angle operating means 7 are input into the controlling means 8, the controlling means 8 compares triangular waves L1, L2, L3, etc. which are synchronized with the phases of commutation voltages V1, V2, V3, etc. with the phase-control angles α1, α2 and α3, as shown in FIG. 14(a), FIG. 14(b) and FIG. 14(c). Then, the controlling means 8 generates ignition pulses to each switching device 3U, 3V, 3W, 3X, 3Y and 3Z for turning on each switching device 3U, 3V, 3W, 3X, 3Y and 3Z when the triangular waves L1, L2, L3, etc. which are synchronized with the commutation voltages V1, V2, V3, etc. accord with the phase-control angles α1, α2 and α3 respectively, (for example, when the phase-control angle α1 accords with the triangular wave L1 synchronized with the commutation voltage V1, the controlling means 8 generates an ignition pulse to the switching device 3V of the V-phase).

In this connection, the triangular waves L1, L2, L3, etc. shown in FIGS. 14(a), 14(b) and 14(c) are signals synchronized with the phases of the commutation voltages V1, V2, V3, etc. Phase angles of them are reset to be zero when the commutation voltages V1, V2, V3, etc. become zero, and increase at a constant inclination after that. Even if the phases of the commutation voltages V1, V2, V3, etc. have changed by an accident in an ac system, these triangular waves L1, L2, L3, etc. are always synchronized with the phases of the commutation voltages V1, V2, V3, etc. before the changes. These triangular waves L1, L2, L3, etc. are generated by the controlling means 8.

Since the conventional power converter controlling apparatus is composed as described above, it takes tens of milli-seconds to operate average values of the amplitudes of each phase because it must eliminate higher harmonics by using a filter for detecting the amplitudes of ac voltages, which detection of the ac voltages of each phase and operation of the average values of the amplitudes of each phase are premises for controlling power converters. Consequently, the conventional power converter controlling apparatus cannot control power converters immediately after changes of ac voltages by an accident or the like. As a result, the conventional power converter controlling apparatus has a problem that it causes the failure of commutation because it cannot keep an extinction angle for controlling, then it becomes impossible to transmit electric power to ac systems.

In addition, since the conventional power converter controlling apparatus outputs phase-control angles based not on amplitudes of each phase but on average values of each phase, it cannot always control the switching devices of each phase at appropriate phase-control angles. As a result, it has also a problem that it causes the failure of commutation similarly, then it becomes impossible to transmit electric power to ac systems.

SUMMARY OF THE INVENTION

In view of the foregoing, it is an object of the present invention to provide a power converter controlling apparatus which can prevent the failure of commutation of each switching device in case of changes of ac voltages caused by an accident or the like.

It is another object of the present invention to provide a power converter controlling apparatus which can prevent non-theoretical higher harmonics from flowing out from a power converter to ac systems.

It is a further object of the present invention to provide a power converter controlling apparatus which can transmit a large amount of electric power as long as non-theoretical higher harmonics are within a prescribed range.

It is a further object of the present invention to provide a power converter controlling apparatus which can select either of the prevention of the effluence of non-theoretical higher harmonics or the increment of transmitting electric power.

It is a further object of the present invention to provide a power converter controlling apparatus which can prevent the failure of commutation of each switching device in case of recovering of voltages having changed by an accident or the like, also.

According to the first aspect of the present invention, for achieving the above-mentioned objects, there is provided a power converter controlling apparatus which outputs voltage signals different in phase from phases of commutation voltages of each switching device by 90 degrees to transform the voltage signals and the commutation voltages in conformity with polar coordinate transformation, which power converter controlling apparatus outputs amplitudes of the commutation voltages and phase differences of the commutation voltages to a reference phase on results of the transformation, and which power converter controlling apparatus outputs phase-control angles of each switching device on the amplitudes and the phase differences.

As stated above, the power converter controlling apparatus according to the first aspect of the present invention is provided with a first operating means which outputs voltage signals different in phase from phases of commutation voltages detected by a commutation voltage detecting means by 90 degrees to transform the voltage signals and the commutation voltages in conformity with polar coordinate transformation, which operating means outputs amplitudes of the commutation voltages and phase differences of the commutation voltages to a reference phase, and consequently, amplitudes and phase differences of commutation voltages can be obtained without time delay after changes of the commutation voltages.

According to the second aspect of the present invention, there is provided a power converter controlling apparatus which controls each switching device on a phase-control angle having the smallest value among phase-control angles of each switching device outputted by a second operating means.

As stated above, the power converter controlling apparatus according to the second aspect of the present invention is provided with a controlling means which controls each switching device on a phase-control angle having the smallest value among phase-control angles of each switching device outputted by a second operating means, and consequently, the power converter controlling apparatus can control each switching device without generating non-theoretical higher harmonics from a power converter to ac systems.

According to the third aspect of the present invention, there is provided with a power converter controlling apparatus which controls each switching device on a phase-control angle selected by a first selecting means if higher harmonics detected by a higher harmonics detecting means are larger than a prescribed value, and which controls each switching device based on phase-control angles outputted by a second operating means if the higher harmonics are not larger than the prescribed value.

As stated above, the power converter controlling apparatus according to the third aspect of the present invention is provided with a controlling means which controls each switching device based on a phase-control angle selected by a first selecting means if higher harmonics detected by a higher harmonics detecting means are larger than a prescribed value, and which controls each switching device based on phase-control angles outputted by a second operating means if the higher harmonics are not larger than the prescribed value, and consequently, non-theoretical higher harmonics which flow out from a power converter to ac systems are limited within a prescribed range, and it becomes possible to transmit a large amount of electric power in that range.

According to the fourth aspect of the present invention, there is provided a power converter controlling apparatus which controls each switching device based on a phase-control angle selected by a first selecting means if a switching signal output by a second selecting means indicates that each switching device should be controlled on the selected phase-control angle, and which controls each switching device based on phase-control angles outputted by a second operating means if the switching signal indicates that the each switching device should be controlled based on the outputted phase-control angles.

As stated above, the power converter controlling apparatus according to the fourth aspect of the present invention is provided with a controlling means which controls each switching device based on a phase-control angle selected by a first selecting means if a switching signal output by a selecting means indicates that each switching device should be controlled based on the selected phase-control angle, and which controls each switching device based on phase-control angles outputted by a second operating means if the switching signal indicates that each switching device should be controlled based on the operated phase-control angles, and consequently, it becomes possible to select either of the prevention of the effluence of non-theoretical higher harmonics or the increment of the amount of electric power transmission on demand.

According to the fifth aspect of the present invention, there is provided a power converter controlling apparatus which outputs phase-control angles having been outputted by a second operating means and being returned at a prescribed delay time constant, and which compares the largeness of the returned phase-control angles with the largeness of the phase-control angles having been outputted by the second operating means to output smaller ones to a controlling means.

As stated above, the power converter controlling apparatus according to the fifth aspect of the present invention is provided with a phase-control angle returning means which outputs phase-control angles having been outputted by a second operating means and being returned at a prescribed delay time constant, and which compares the largeness of the returned phase-control angles with the largeness of the phase-control angles having been outputted by the second operating means to output smaller ones to a controlling means, and consequently, it becomes possible to prevent the failure of commutation of each switching device even when voltages having changed by an accident or the like recover.

According to the sixth aspect of the present invention, there is provided a power converter controlling apparatus which outputs a phase-control angle having been selected by a first selecting means and being returned at a prescribed delay time constant, and which compares the largeness of the returned phase-control angle with the largeness of the phase-control angle having been selected by the first selecting means to output the smaller one to a controlling means.

As stated above, the power converter controlling apparatus according to the sixth aspect of the present invention is provided with a phase-control angle returning means which outputs a phase-control angle having been selected by a first selecting means and being returned at a prescribed delay time constant, and which compares the largeness of the returned phase-control angle with the largeness of the phase-control angle having been selected by the first selecting means to output the smaller one to a controlling means, and consequently, it becomes possible to prevent the failure of commutation of each switching device even when voltages having changed by an accident or the like recover.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 13(a) is a connection diagram showing the relation of a connection between the power converter 3 and the transformer 2 of the conventional power converter controlling apparatus of FIG. 12;

FIG. 13(b) is a vector diagram showing each voltage of the transformer 2 of FIG. 13(a);

FIG. 13(c) is a table showing amplitudes of each commutation voltage of the circuits of FIG. 13(a)

DETAILED DESCRIPTION OF THE PREFERRED EMBODIMENTS

Preferred embodiments of the present invention will now be described in detail with reference to the accompanying drawings.

EMBODIMENT 1.

Figure 1:
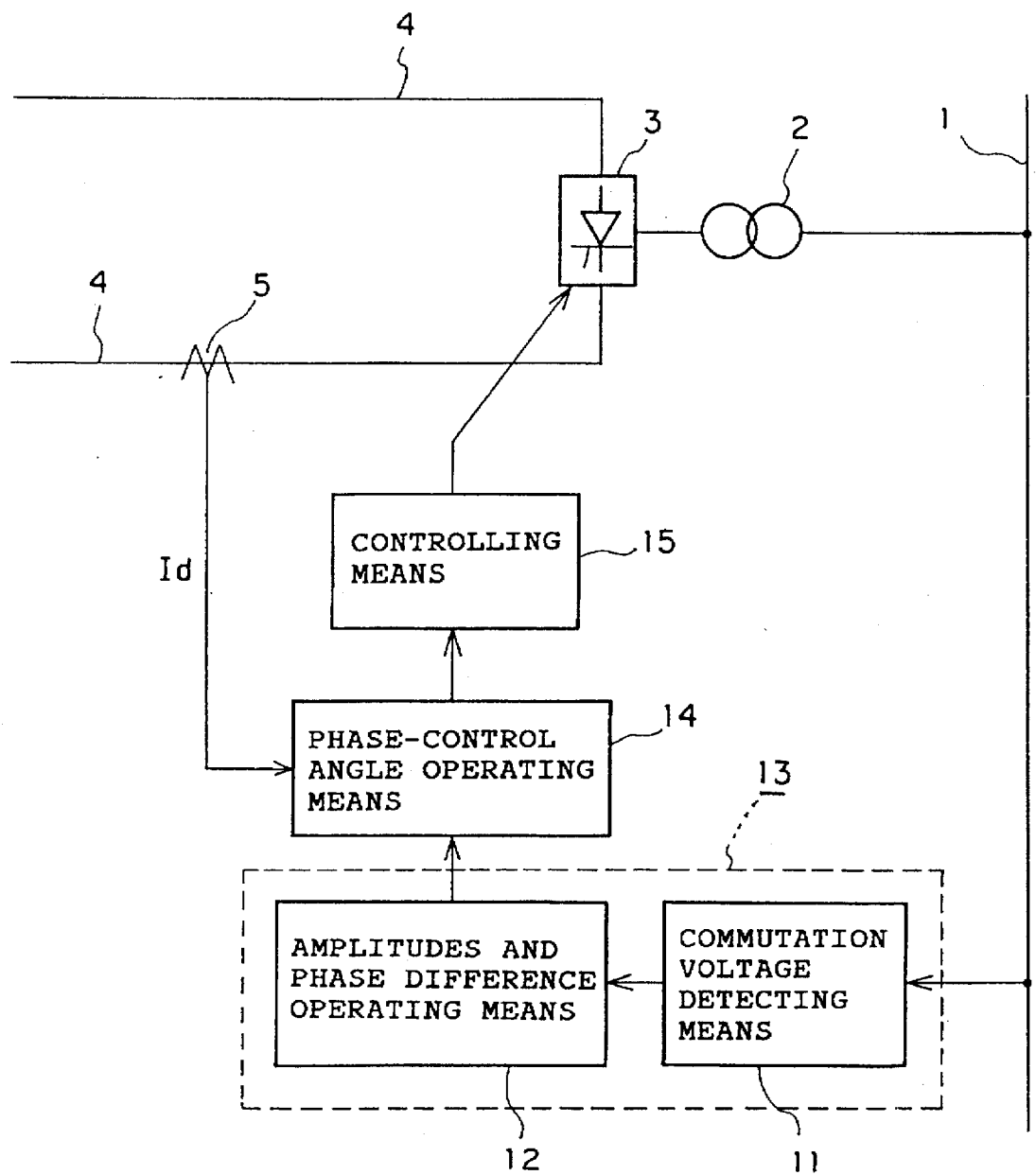
FIG. 1 is a block diagram showing a power converter controlling apparatus according to a first embodiment of the present invention.

FIG. 1 is a block diagram showing a power converter controlling apparatus according to a first embodiment of the present invention. In FIG. 1, the same reference numerals as those of the aforementioned conventional power converter controlling apparatus designate the same or the corresponding parts of the conventional apparatus, and therefore a description of them will be omitted.

Reference numeral 11 designates a commutation voltage detecting means for detecting the commutation voltages V1 etc. of each switching device 3U etc. constituting the power converter 3; numeral 12 designates an amplitude and phase difference operating means (or a first operating means) which outputs voltage signals dtV1 etc. different in phase from phases of the commutation voltages V1 etc. detected by the commutation voltage detecting means 11 by 90 degrees to transform the voltage signals dtV1 etc. and the commutation voltages V1 etc. in conformity with polar coordinate transformation, which operating means outputs amplitudes $\sqrt{2}$.Vcom1 etc. of the commutation voltages V1 etc. and phase differences $\Phi$com1 etc. of the commutation voltages V1 etc. to reference phases (which are commutation voltages V1 etc. before voltage changes occur) on results of the transformation; and the amplitude and phase difference operating means 12 and the commutation voltage detecting means 11 constitute an ac voltage detecting apparatus 13.

Reference numeral 14 designates a phase-control angle outputting means (or a second operating means) for operating phase-control angles $\alpha$1 etc. based of each switching device 3U etc. on the amplitudes and the phase differences outputted by the amplitude and phase difference operating means 12; numeral 15 designates a controlling means for controlling each switching device 3U etc. according to the phase-control angles $\alpha$1 etc. outputted by the phase-control angle operating means 14.

Figure 2:
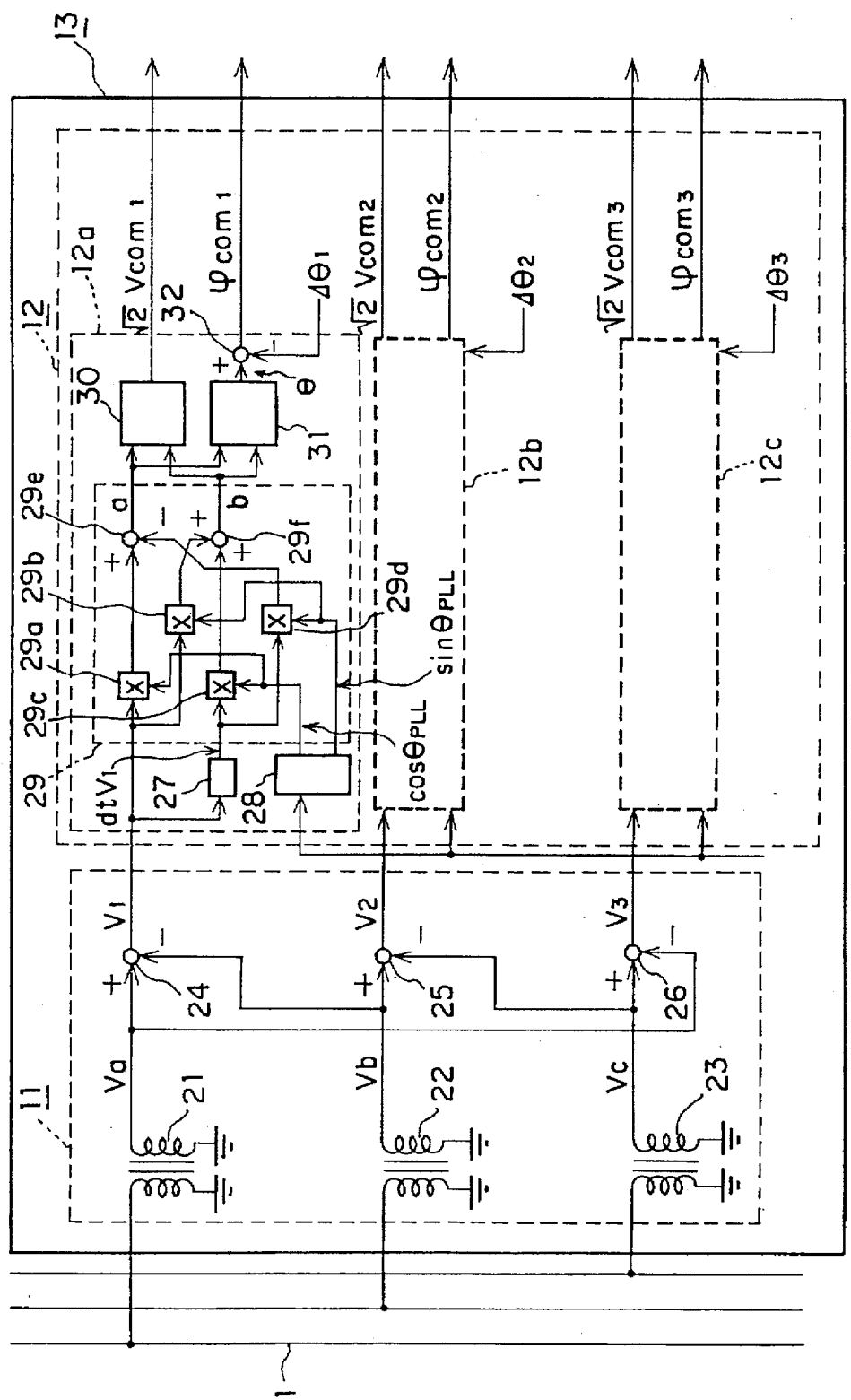
FIG. 2 is a block diagram showing a detailed construction of the ac voltage detecting apparatus 13 of the embodiment of FIG. 1.

FIG. 2 is a block diagram showing the detailed construction of the ac voltage detecting apparatus 13. In FIG. 2, reference numerals 21 to 23 designate voltage detectors for detecting phase voltages Va, Vb and Vc in the ac transmission lines 1; and numerals 24 to 26 designate subtracters for outputting commutation voltages V1(=Va−Vb), V2(=Vb−

Vc) and V3(=Vc−Va) from results detected by the voltage detectors 21 to 23. Reference numeral 27 designates a differential operation circuit differentiating the commutation voltage V1; and numeral 28 designates a trigonometric function calculating circuit for calculating cosines $\cos\theta_{PLL}$ and sines $\sin\theta_{PLL}$ of phases $\theta_{PLL}$ output from a PLL (or Phase Locked Loop) circuit (not shown) and the like. In this connection, the phases $\theta_{PLL}$ designate phase signals which are synchronized with the commutation voltage V3(=Vc−Va) before voltage changes occur, and the phases $\theta_{PLL}$ are always synchronized with the commutation voltage V3 before voltage changes occur even if the commutation voltage V3 changes.

Reference numeral 29 designates a product and sum calculating circuit for transforming the voltage signal dtV1 (which is the result of differentiation of the commutation voltage V1) and the commutation voltage V1 in conformity with polar coordinate transformation; numerals 29a to 29d designate multipliers; numeral 29e designates a subtracter; and numeral 29f designates an adder. Reference numeral 30 designates an absolute value calculating circuit for outputting the amplitude of the commutation voltage V1 based on the outputs of the product and sum calculating circuit 29; numeral 31 designates an inverse trigonometric function calculating circuit for outputting a phase by subtracting the phase $\theta_{PLL}$ from the phase of the commutation voltage V1 based on an output of the product and sum calculating circuit 29; and numeral 32 designates a subtracter subtracting $\Delta\theta1$ from the output of the inverse trigonometric function calculating circuit 31 for outputting the phase difference $\Phi\text{com}1$ of the commutation voltage V1 to the reference phases. In this connection, marks $\Delta\theta1$, $\Delta\theta2$ and $\Delta\theta3$ designate phase differences between the phases of the commutation voltages V1, V2, V3 before voltage changes occur and the phase $\theta_{PLL}$, and they satisfy the following relations since the phase $\theta_{PLL}$ is synchronized with the commutation voltage V3 in this embodiment as mentioned above.

$$\Delta\theta1 = \Delta\theta3 - 120°, \quad \Delta\theta2 = \Delta\theta3 + 120°$$

Further, reference numerals 12a, 12b and 12c designate sections outputting the amplitudes and the like of the commutation voltages V1, V2 and V3 respectively. Because the sections 12b and 12c have the same constructions as that of the section 12a, the descriptions for them are omitted.

Next, the operation thereof will be described. The commutation voltage detecting means 11 of the ac voltage detecting apparatus 13 outputs the commutation voltages V1, V2 and V3 by using the subtracters 24 to 26 in conformity with the following formulae after detecting the phase voltages Va, Vb and Vc in the ac transmission lines 1 by using the voltage detectors 21 to 23.

V1=Va−Vb

V2=Vb−Vc

V3=Vc−Va

Then, the amplitude and phase difference operating means 12 outputs the amplitudes and the like of the commutation voltages V1, V2 and V3 after the voltages V1, V2, V3 were input. Because the operating means 12 performs similar calculations on each of the commutation voltages V1, V2 and V3, description will be made of the commutation voltage V1 as an example here. In the next description, it is supposed that the commutation voltage V1 $=\sqrt{2} * \text{Vcom1} * \sin(\theta_{PLL}+\theta)$.

At first, the differential operation circuit 27 outputs a voltage signal dtV1 whose phase is advanced by 90 degrees to the phase of the commutation voltage V1 by differentiating the commutation voltage V1 as a function of time (namely the voltage signal is the commutation voltage dtV1) as shown in the next formula.

$$dtV1 = \sqrt{2} * \text{Vcom1} * \cos(\theta_{PLL}+\theta) \tag{2}$$

After the commutation voltage V1 and the commutation voltage dtV1 are input, the product and sum calculating circuit 29 transforms the commutation voltage V1 and the commutation voltage dtV1 on the values of $\cos\theta_{PLL}$ and $\sin\theta_{PLL}$ which are input from the trigonal function calculating circuit 28 as follows.

$$\begin{pmatrix} a \\ b \end{pmatrix} = \begin{pmatrix} \cos\theta_{PLL} & -\sin\theta_{PLL} \\ \sin\theta_{PLL} & \sin\theta_{PLL} \end{pmatrix} \begin{pmatrix} V1 \\ dtV1 \end{pmatrix} \tag{3}$$

$$= \begin{pmatrix} \cos\theta_{PLL} & -\sin\theta_{PLL} \\ \sin\theta_{PLL} & \sin\theta_{PLL} \end{pmatrix} \cdot \begin{pmatrix} \sqrt{2}\,\text{Vcom1}\cdot\sin(\theta_{PLL}+\theta) \\ \sqrt{2}\,\text{Vcom1}\cdot\cos(\theta_{PLL}+\theta) \end{pmatrix}$$

$$= \sqrt{2}\,\text{Vcom1}\cdot\begin{pmatrix} \sin\theta \\ \cos\theta \end{pmatrix}$$

After completing the polar coordinate transformation of the product and sum calculating circuit 29, the absolute value calculating circuit 30 outputs the amplitude of the commutation voltage V1 by taking the square root of the sum of squared a and squared b which are outputs of the product and sum calculating circuit 29, as shown in the following.

$$\text{The amplitude of the commutation voltage V1} \tag{4}$$
$$= (a^2 + b^2)^{1/2}$$

$$= \{(\sqrt{2} * \text{Vcom1} * \sin\theta)^2 + (\sqrt{2} * \text{Vcom1} * \cos\theta)^2\}^{1/2}$$

$$= \sqrt{2} * \text{Vcom1}(\sin^2\theta + \cos^2\theta)$$

$$= \sqrt{2} * \text{Vcom1}$$

After the polar coordinate transformation of the product and sum calculating circuit 29 has been completed, the inverse trigonometric function calculating circuit 31 outputs a phase $\theta$ by subtracting the phase $\theta_{PLL}$ from the phase $\theta_{PLL}+\theta$ of the commutation voltage V1 based on the outputs a and b of the product and sum calculating circuit 29 as shown in the following.

$$\tan^{-1}(a/b) \tag{5}$$

$$= \tan^{-1}\{(\sqrt{2} * \text{Vcom1} * \sin\theta)/(\sqrt{2} * \text{Vcom1} * \cos\theta)\}$$

$$= \tan^{-1}(\sin\theta/\cos\theta)$$
$$= \theta$$

By subtracting $\Delta\theta1$ (namely the phase difference between the reference phase (or the phase $\theta$ of the commutation voltage V1 when voltage changes do not occur) and the phase $\theta_{PLL}$) from the phase $\theta$ having been outputted by the inverse trigonometric function calculating circuit 31, the subtracter 32 outputs the phase difference $\Phi\text{com}1$ between the commutation voltage V1 before the change and the commutation voltage V1 after the change as follows.

$$\Phi com1 = \theta - \Delta\theta 1 \quad (6)$$

After the amplitudes and the phase differences of the commutation voltages are thus obtained, the amplitudes and the phase differences of the commutation voltages are output to the phase-control angle operating means 14. Since the phase-control angle operating means 14 can output the amplitudes and phase differences of the commutation voltages without the filter which is necessary to the conventional averaged ac voltage detector 6, the amplitudes and the phase differences of the commutation voltages can be outputted without any time delay at high speed.

After that, the phase-control angle operating means 14 outputs phase-control angles $\alpha 1$, $\alpha 2$ and $\alpha 3$ of each switching device 3U etc. based on the amplitudes and the phase differences outputted by the ac voltage detecting apparatus 13 as follows:

$$\alpha i = \cos^{-1}(\sqrt{2} * X * Id / Vcom_i - \cos\gamma) - \Phi com_i \quad (7)$$

where i=1, 2, 3.

Figure 3:
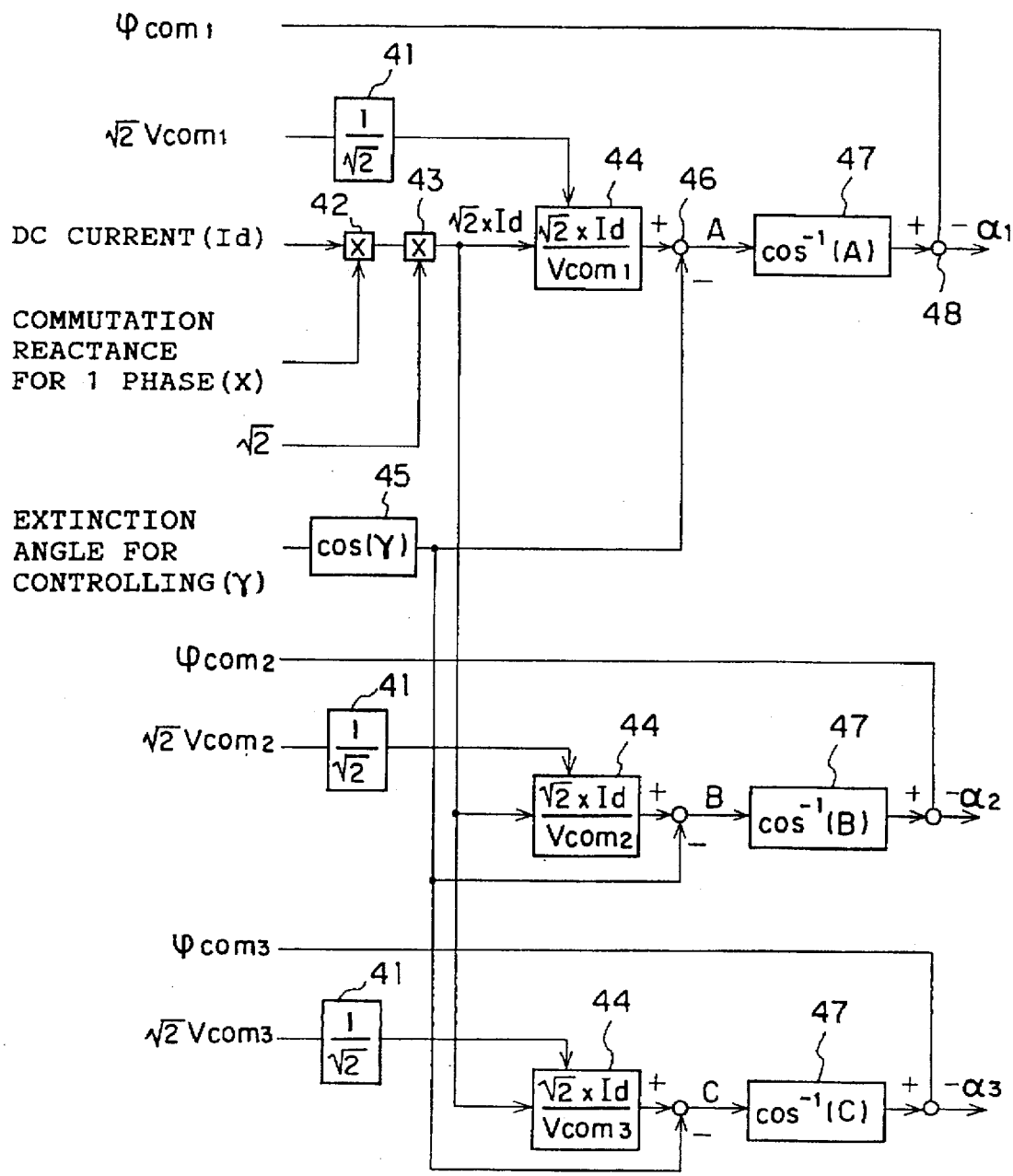
FIG. 3 is a block diagram showing a detailed construction of the phase-control angle operating means 14 of the embodiment of FIG. 1.

FIG. 3 is a block diagram showing the phase-control angle operating means 14 for executing the operation of formula (7). In FIG. 3, reference numeral 41 designates a dividing circuit; numerals 42, 43 designate multiplying circuits; numeral 44 designates a dividing circuit; numeral 45 designates a trigonometric function calculating circuit; numeral 46 designates a subtracter; numeral 47 designates an inverse trigonometric function calculating circuit; and numeral 48 designates a subtracter.

In this connection, the phase-control angle $\alpha 1$ designates a phase-control angle in case of the commutation from the U-phase to the V-phase; the phase-control angle $\alpha 2$ designates a phase-control angle in case of the commutation from the V-phase to the W-phase; and the phase-angle $\alpha 3$ designates a phase-control angle in case of the commutation from the W-phase to the U-phase. As for the phase-angles in case of the commutations from the X-phase to the Y-phase, from the Y-phase to the Z-phase and from the Z-phase to the X-phase, the ignition pulses of the X-phase etc. can be generated by using the phase-control angles $\alpha 1$, $\alpha 2$ and $\alpha 3$ in case triangular waves L4 etc. synchronized with the commutation voltages -V1 (or the commutation voltage from the X-phase to the Y-phase) etc. which are generated by the controlling means 15 (which will be described later) are delayed from the triangular waves L1 etc. synchronized with the commutation voltages V1 (or the commutation voltage from the U-phase to the V-phase) etc. by 180 degrees respectively. Consequently, only the phase-control angles $\alpha 1$, $\alpha 2$ and $\alpha 3$ are outputted in this embodiment.

Figure 4:
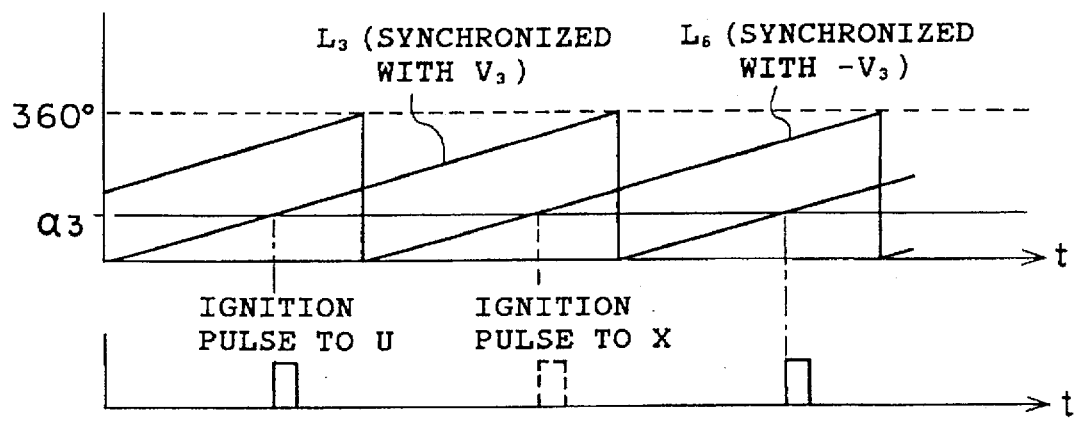
FIG. 4(a), FIG. 4(b) and FIG. 4(c) are drawings showing signal waves for illustrating the operation of the controlling means 15 of the embodiment of FIG. 1.
Figure 4:
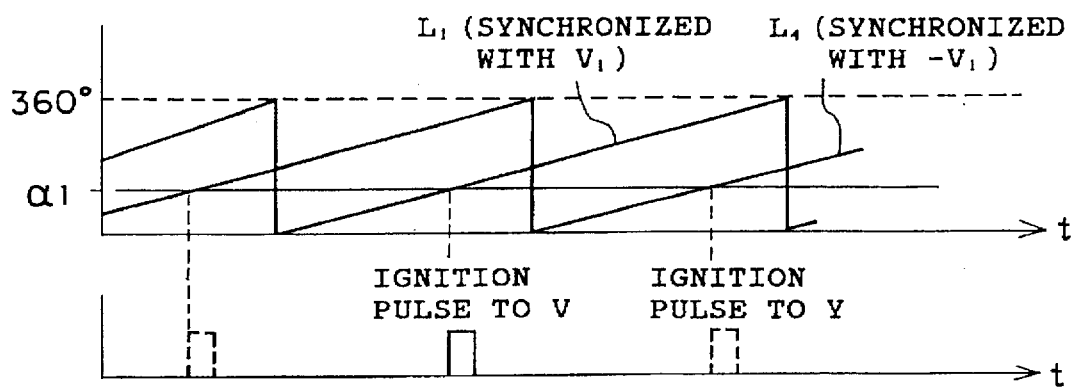
Figure 4:
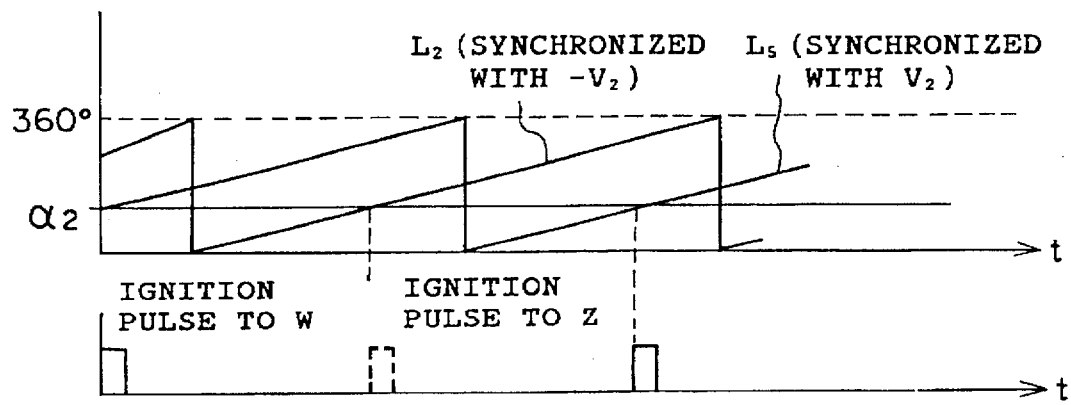

When the phase-control angles $\alpha 1$, $\alpha 2$ and $\alpha 3$ having been outputted by the phase-control angle operating means 14 are input to the controlling means 15, as shown in FIG. 4(a), FIG. 4(b) and FIG. 4(c), the controlling means 14 compares triangular waves L1, L2, . . . , L6 synchronized with the phases of the commutation voltages V1, V2, V3, -V1, -V2 and -V3 respectively with the phase angles $\alpha 1$, $\alpha 2$ and $\alpha 3$ to generate ignition pulses to each switching device for turning on them when the triangular waves L1, L2, . . . , L6 become the same as the phase angles $\alpha 1$, $\alpha 2$ and $\alpha 3$. For example, when the phase-control angle $\alpha 3$ becomes the same as the triangular wave L3 synchronized with the commutation voltage V3, the controlling means 15 generates an ignition pulse to the switching device 3U of the U-phase; and when the phase-control angle $\alpha 1$ becomes the same as the triangular wave L4 synchronized with the commutation voltage -V1, the controlling means 15 generates an ignition pulse to the switching device 3Y of the Y-phase.

In this connection, the triangular waves L1 to L6 of FIGS. 4(a), 4(b) and 4(c) are signals synchronized with the phases of the commutation voltages V1, V2, V3, -V1, -V2 and -V3, and the phase angles of the triangular waves L1 to L6 are respectively reset to a zero point when the commutation voltages become zero and increase at a constant inclination after that. In addition, even if the phases of the commutation voltages are changed by an accident in an ac system, the triangular waves are always synchronized with the phase of commutation voltages before the changes. The triangular waves are generated by the controlling means 15.

As mentioned above, since the amplitudes and the phase differences of commutation voltages can be outputted by the ac voltage detecting apparatus 13 without any time delay to the changes of the commutation voltages by means of this embodiment 1, the phase-control angle operating means 14 can output the phase-control angles $\alpha 1$, $\alpha 2$ and $\alpha 3$ without any time delay to the changes of the commutation voltages. As a result, the situation that it is impossible to maintain the extinction angle $\gamma$ for controlling because of the time spent to the operation of the phase-control angles $\alpha$ in the conventional power converter controlling apparatus never occurs, and consequently, the failure of commutation of each switching device can be prevented even if commutation voltages change, and appropriate electric power can always be transmitted.

According to the embodiment 1, since phase-control angles are outputted based not on the averaged voltages of each phase as in the conventional apparatus but on the amplitudes and the like of each commutation voltage, the phase-control angles of each phase switching device can be obtained more appropriately than by the conventional apparatus.

EMBODIMENT 2.

In the aforementioned embodiment 1, the triangular waves L4 etc. synchronized with the commutation voltages -V1 (from the X-phase to the Y-phase) etc. are respectively delayed from the triangular waves L1 etc. synchronized with the commutation voltages V1 (from the U-phase to the V-phase) etc. by 180 degrees, and the delayed triangular waves L1 etc. are compared with the phase-control angles $\alpha 1$, $\alpha 2$ and $\alpha 3$ for the generation of ignition pulses to the X-phase etc. But the ignition pulses to the X-phase etc. may be generated by operating phase-control angles $\alpha 4$, $\alpha 5$ and $\alpha 6$ corresponding to the commutation voltages -V1 etc. by using phase differences obtained by substituting 180 degrees from the phase differences $\Phi com1$, $\Phi com2$ and $\Phi com3$ respectively, and by comparing the phase-control angles $\alpha 4$, $\alpha 5$ and $\alpha 6$ with the triangular waves L1 etc. synchronized with the commutation voltages V1 (from the U-phase to the V-phase) etc. By means of the latter method, the same effects as those obtained by the aforementioned embodiment 1 can be obtained.

EMBODIMENT 3.

In the aforementioned embodiment 1, the commutation voltages are phase voltages of each phase, but the commutation voltages may be the voltages between lines of each phase. The latter method can bring about the same effects.

EMBODIMENT 4.

Figure 5:
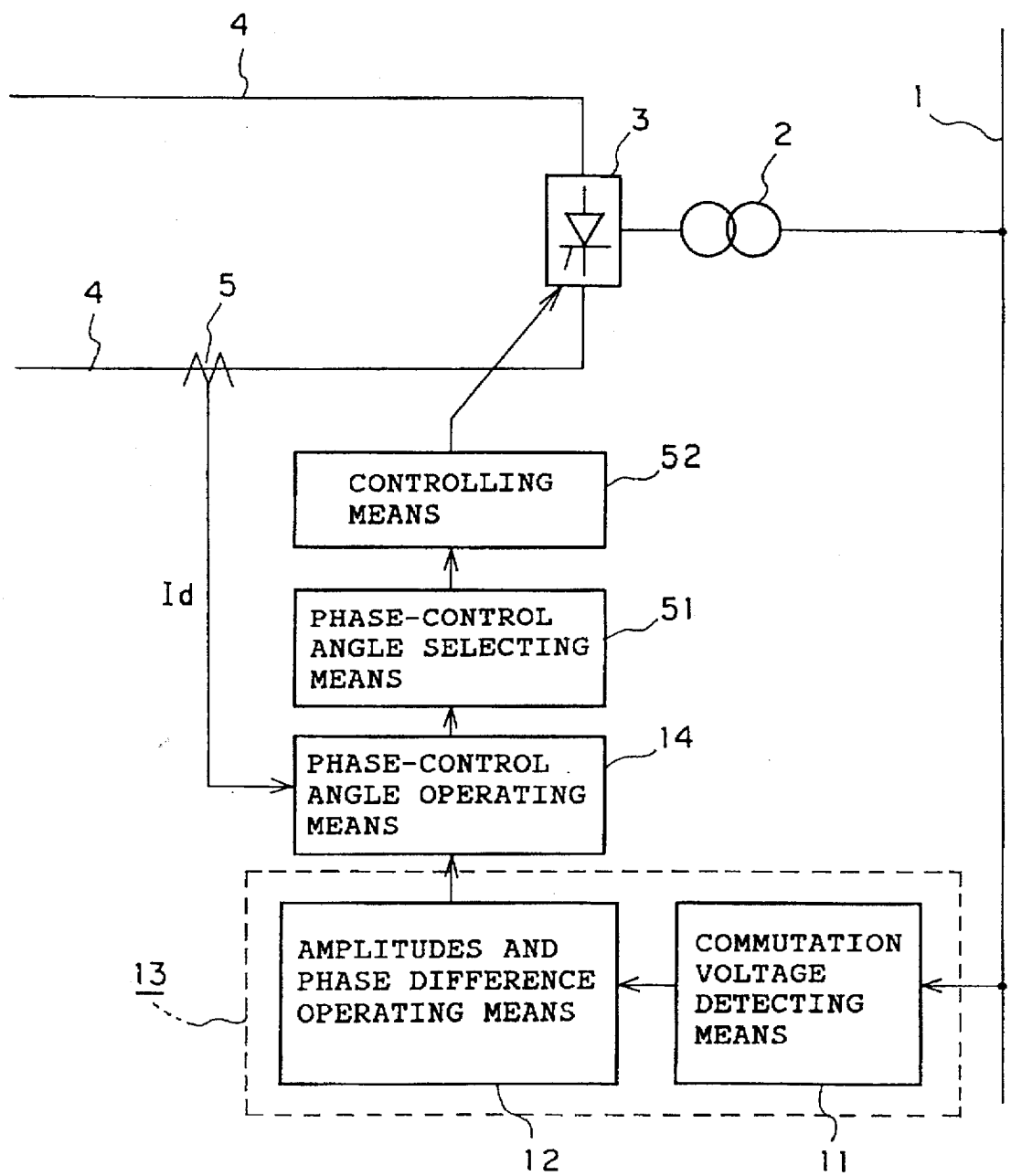
FIG. 5 is a block diagram showing a power converter controlling apparatus according to a second embodiment of the present invention.

FIG. 5 is a block diagram showing a power converter controlling apparatus according to another embodiment of the present invention. In FIG. 5, reference numeral 51 designates a phase-control angle selecting means (or a first selecting means) for selecting a phase-control angle having the smallest value among the phase-control angles $\alpha 1$, $\alpha 2$ and $\alpha 3$ of each switching device outputted by the phase-control angle operating means 14; and numeral 52 designates a controlling means for controlling each switching device on the phase-control angle selected by the phase-control angle selecting means 51.

Next, the operation thereof will be described. Because the elements other than the phase-control angle selecting means 51 and the controlling means 52 are the same as those of the embodiment 1, only the phase-control angle selecting means 51 and the controlling means 52 will be described. When the phase-control angles α1, α2 and α3 of each switching device have been outputted by the phase-control angle operating means 14, the phase-control angle selecting means 51 selects a phase-control angle having the smallest value among the phase-control angles α1, α2 and α3 as shown in FIG. 6.

Figure 6:
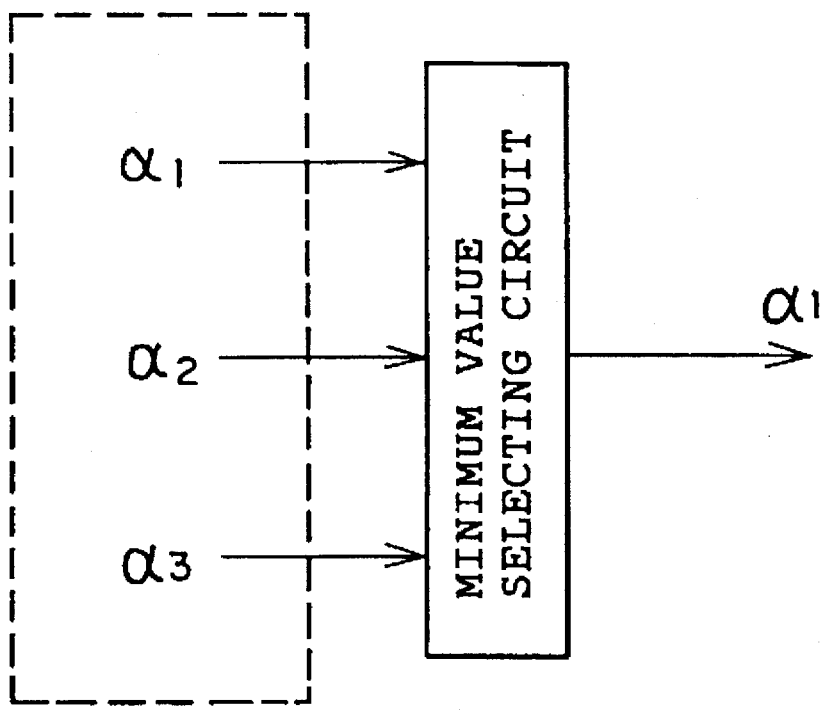
FIG. 6 is a block diagram showing the phase-angle selecting means 51 of the embodiment of FIG. 5.

In case of FIG. 6, the examples of the phase-control angles α1, α2 and α3 are 60 degrees, 180 degrees and 300 degrees respectively, and consequently, the phase-control angle α1 having the smallest value is selected in this case.

When the phase-control angle having the smallest value has been selected, the controlling means 52 controls each switching device on the selected phase-control angle. But, because the operation of the controlling means 52 itself is the same as that of the controlling means 8, the description thereof is omitted. The reason why the control is executed on the phase-control angle having the smallest value as mentioned above is that it is necessary to control each switching device in accordance with the phase-control angle having the smallest margin because of the following reasons. That is to say, the larger the changes of phases are, the smaller the phase-control angle becomes; and the commutation will be in failure unless the sooner the ignition is controlled, the smaller the phase-control angle is.

In the embodiment 4, since the control is executed on the smallest phase-control angle, the failure of commutation of each switching device can be prevented as in the aforementioned embodiment 1 without the effluence of non-theoretical higher harmonics (or the higher harmonics generated on the occasion of commutation operations) from the power converter 3 to ac systems. That is to say, in case of the embodiment 1, since the control is executed by operating different phase-control angles to each phase, the intervals of ignition pulses output to each phase are somewhat different from each other, and consequently non-theoretical higher harmonics are generated. On the contrary, in case of this embodiment 4, since the control is executed on one phase-control angle, the equality of the intervals of ignition pulses can be kept, and consequently, the non-theoretical higher harmonics are not generated.

EMBODIMENT 5.

Figure 7:
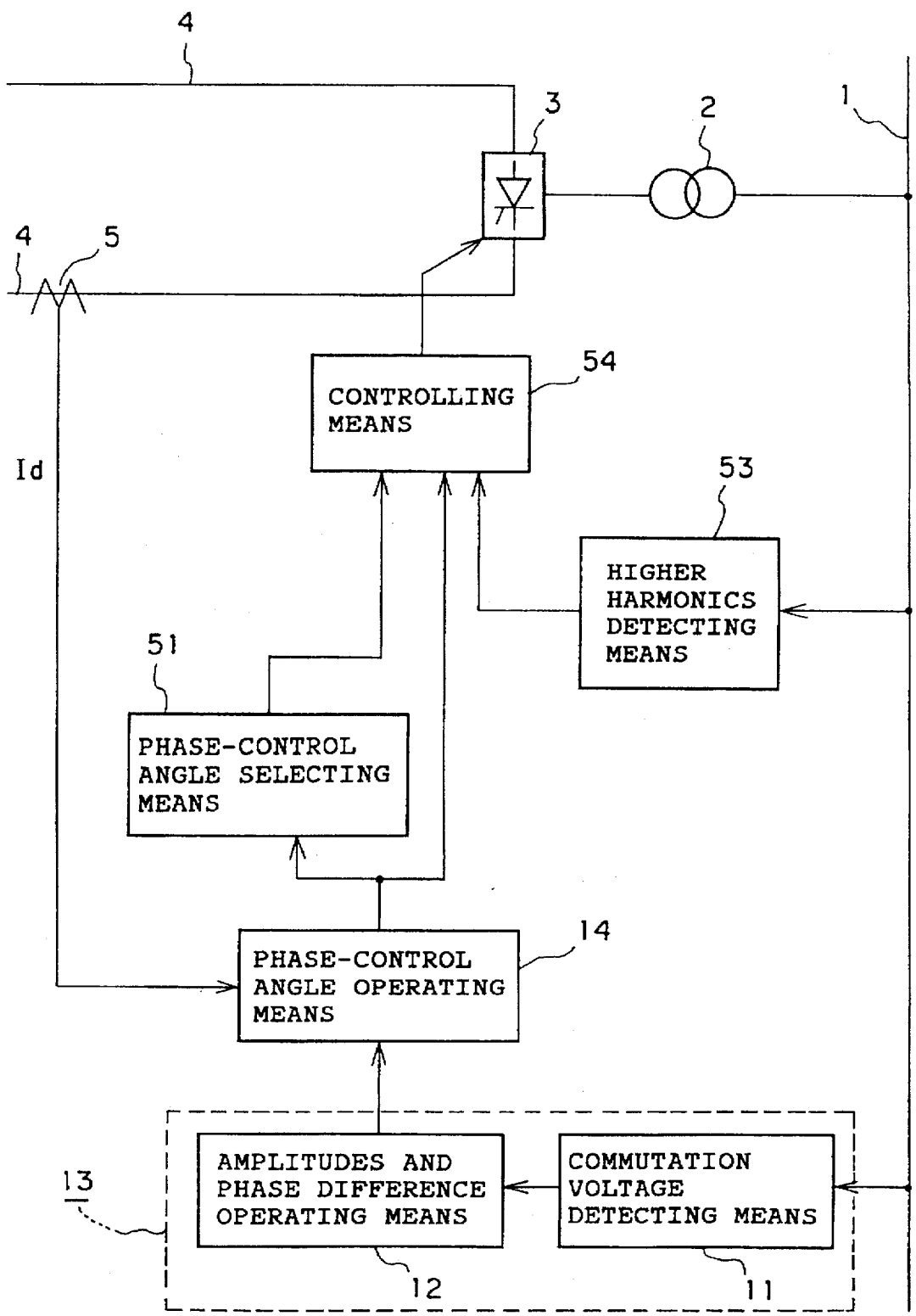
FIG. 7 is a block diagram showing a power converter controlling apparatus according to a third embodiment of the present invention.

FIG. 7 is a block diagram showing a power converter controlling apparatus according to another embodiment of the present invention. In FIG. 7, reference numeral 53 designates a higher harmonics detecting means for detecting higher harmonics contained in an ac system by detecting ac voltages in the ac transmission lines 1; numeral 54 designates a controlling means controlling each switching device based on a phase-control angle selected by the phase-control angle selecting means 51 if higher harmonics detected by the higher harmonics detecting means 53 are larger than a prescribed value, and controlling each switching device on phase-control angles operated by the phase-control angle operating means 14 if the detected higher harmonics are not larger than the prescribed value.

Next, the operation thereof will be described. In case of this embodiment 5, the higher harmonics detected by the higher harmonics detecting means 53 are compared with the prescribed value, and each switching device is controlled on the phase-control angle having been selected by the phase-control angle selecting means 51 (namely controlled similarly in the embodiment 4) if the detected higher harmonics are larger than the prescribed value, and is controlled on the phase-control angles outputted by the phase-control angle operating means 14 (namely controlled similarly in the embodiment 1) if the detected higher harmonics are not larger than the prescribed value, and consequently, the following effects can be obtained by such a control.

That is to say, in case of controlling on the phase-control angle selected by the phase-control angle selecting means 51, since the effluence of non-theoretical higher harmonics can be prevented as mentioned above, the non-theoretical higher harmonics contained in ac systems are eliminated. As the result of that the non-theoretical higher harmonics contained in ac systems are totally reduced, and consequently the amplitudes of the harmonics can be suppressed below a prescribed level. On the other hand, the control based on the phase-control angles outputted by the phase-control angle operating means 14 can transmit more electric power in comparison with the control on the phase-control angle selected by the phase-control angle selecting means 51. Consequently, in case the amplitudes of higher harmonics are below a prescribed value, more electric power can be transmitted.

EMBODIMENT 6.

In the aforementioned embodiment 5, the higher harmonics contained in ac systems are detected by detecting ac voltages in the ac transmission lines 1 by means of the higher harmonics detecting means 53. Alternatively, the higher harmonics contained in ac systems may be detected by detecting ac currents flowing out from the power converter 3 to the ac transmission lines 1 or dc currents flowing in the transmission line 4, which may bring about the same effects as those by the aforementioned embodiment 5.

EMBODIMENT 7.

Figure 8:
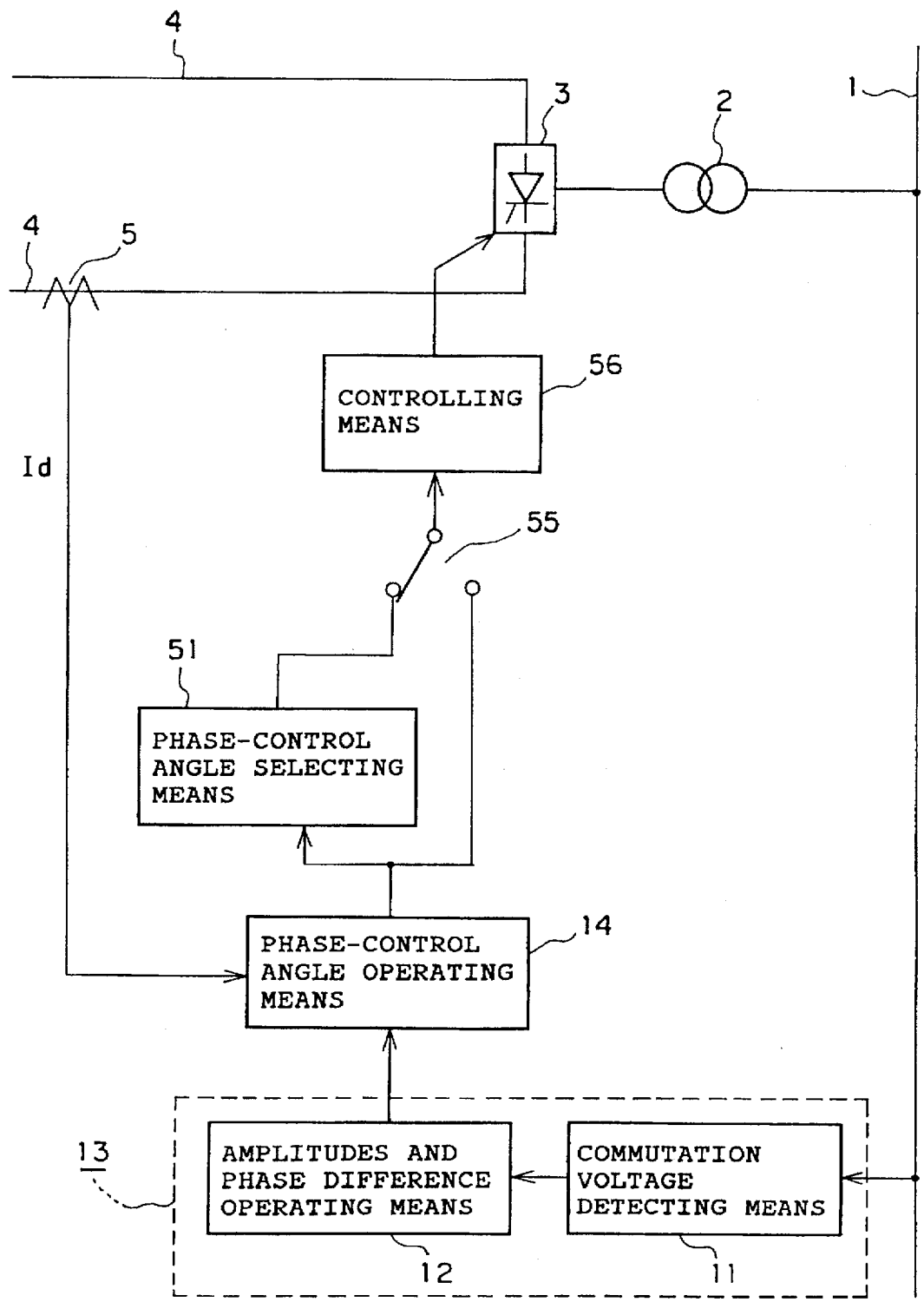
FIG. 8 is a block diagram showing a power converter controlling apparatus according to a fourth embodiment of the present invention.

In the aforementioned embodiment 6, the controlling means 54 switches the controlling methods thereof on the results having been detected by the higher harmonics detecting means 53. Alternatively, as shown in FIG. 8, the controlling methods of the controlling means 56 which is provided with a selecting means (or a second selecting means) 55 for outputting a switching signal to the controlling means 56 may be switched by means of the selecting means 55 on the action of an operator. By employing this method, when the operator wants to increase the amount of transmission electric power, it is enough for the accomplishment of the purpose to input the outputs of the phase-control angle operating means 14 to the controlling means 56 by means of the switching means 55; and when he wants to reduce higher harmonics contained in ac systems, it is enough for the accomplishment of the purpose to input the outputs of the phase-control angle selecting means 51 to the controlling means 56 by means of the selecting means 55.

EMBODIMENT 8.

Figure 9:
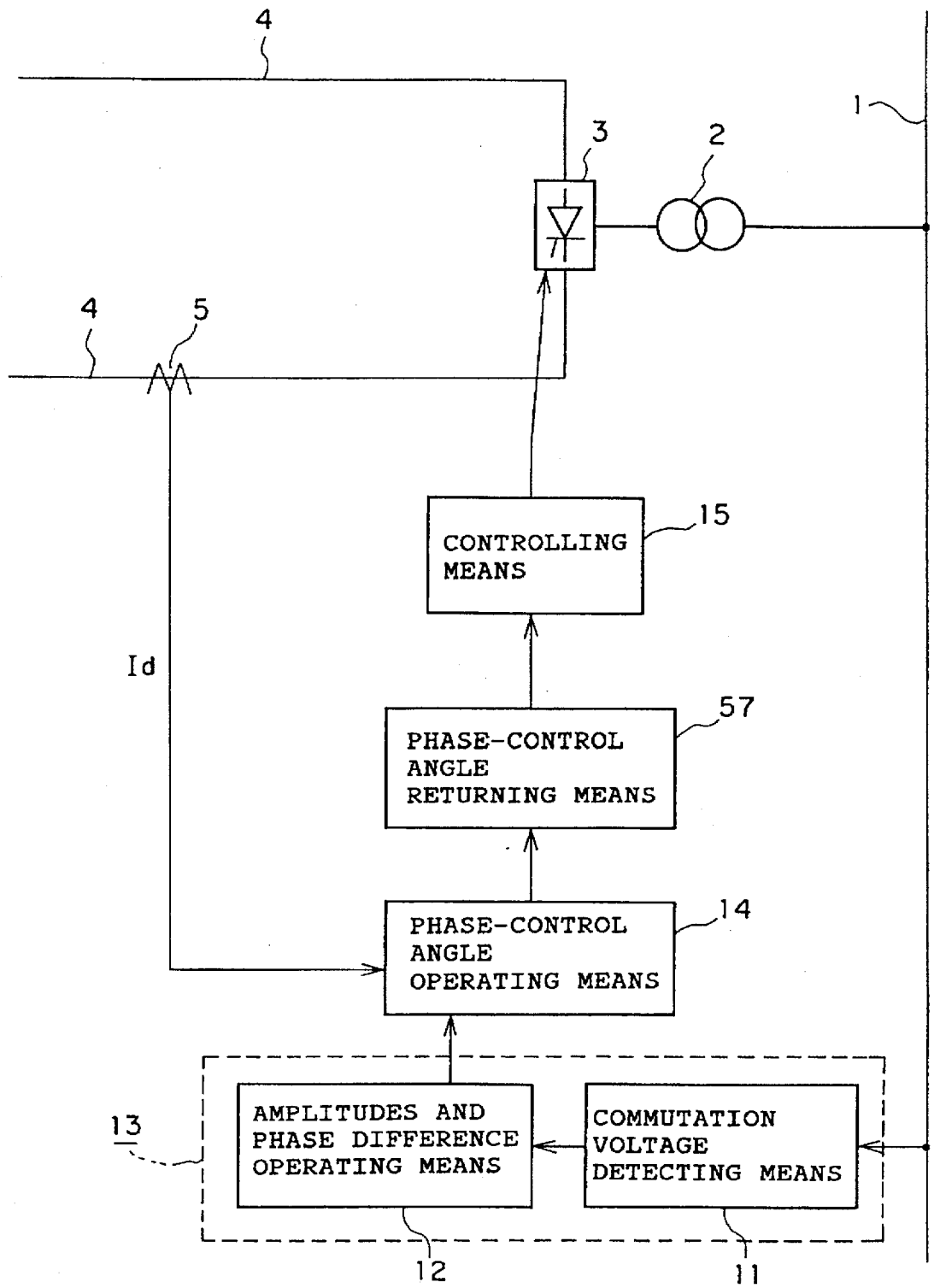
FIG. 9 is a block diagram showing a power converter controlling apparatus according to a fifth embodiment of the present invention.

FIG. 9 is a block diagram showing a power converter controlling means according to another embodiment of the present invention. In FIG. 9; reference numeral 57 designates a phase-control angle returning means for outputting phase-control angles having been outputted by the phase-control angle operating means 14 and being returned at a prescribed delay time constant, which phase-control angle returning means 57 compares the largeness of the returned phase-control angles with the largeness of the phase-control angles having been outputted by the phase-control angle operating means 14 to output smaller ones to the controlling means 15.

Figure 10:
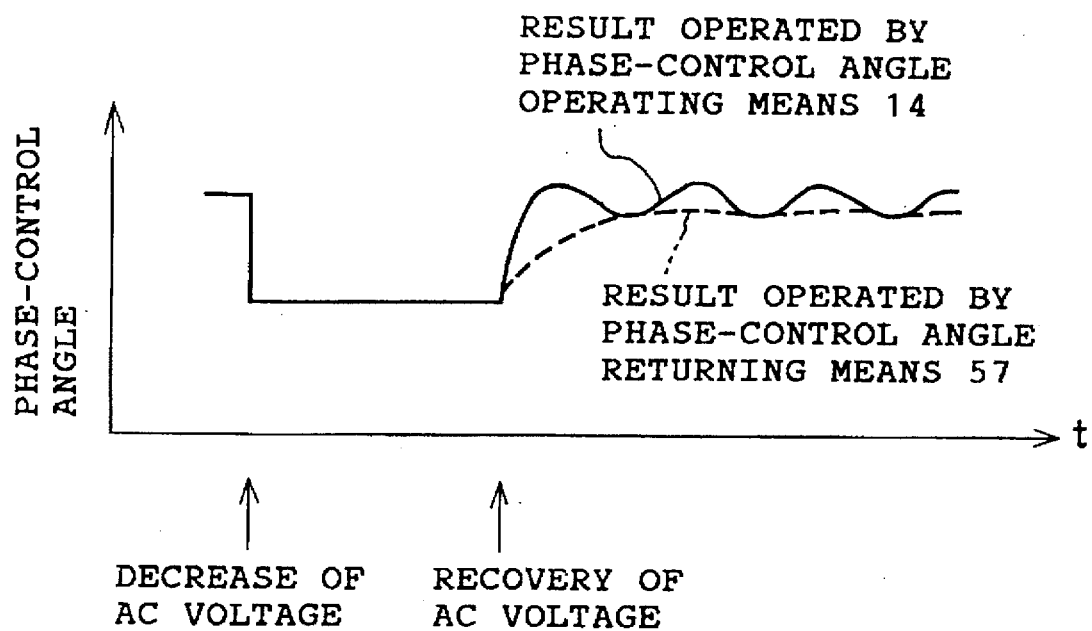
FIG. 10 is a graph showing voltage changes of an ac system.

Next, the operation thereof will be described. Some voltage changes may arise in the power converter controlling apparatus to some conditions of ac systems when the voltages having dropped by an accident in the ac systems recover, (that is to say when phase-control angles are rapidly changed, only a fundamental harmonic is recovered immediately, and the recovery of higher harmonics are delayed, as a result of this phenomenon there is a case where some voltage changes occur). In such a case, as shown as a solid line in FIG. 10, a phase-control angle which is a result of the operation of the phase-control angle operating means 14 changes to decrease the extinction angle γ for controlling of the power converter 3, and consequently the failure of commutation will sometimes happen.

For that reason, in this embodiment 8, after the phase-control angle returning means 57 outputs the phase-control angles having been outputted by the phase-control angle operating means 14 and being returned at a prescribed delay time constant, the phase-control angle returning means 57 compares the largeness of the returned phase-control angles with the largeness of the phase-control angles having been outputted by the phase-control angle operating means 14. Then, if the phase-control angles having been outputted by the phase-control angle operating means 14 are smaller than the returned phase-control angles, the smaller phase-control angles are output to the controlling means 15; and if the returned phase-control angles are smaller than the outputted phase-control angles to the contrary, the returned phase-control angles are output to the controlling means 15. Furthermore, the returned phase-control angles are used as returned input signals having a new delay time constant.

Because the phase-control angles can be recovered slowly in this embodiment in case of the recovery of the voltages having dropped by an accident in ac systems or the like, voltage changes can be prevented and the failure of commutation can be prevented.
EMBODIMENT 9.

Figure 11:
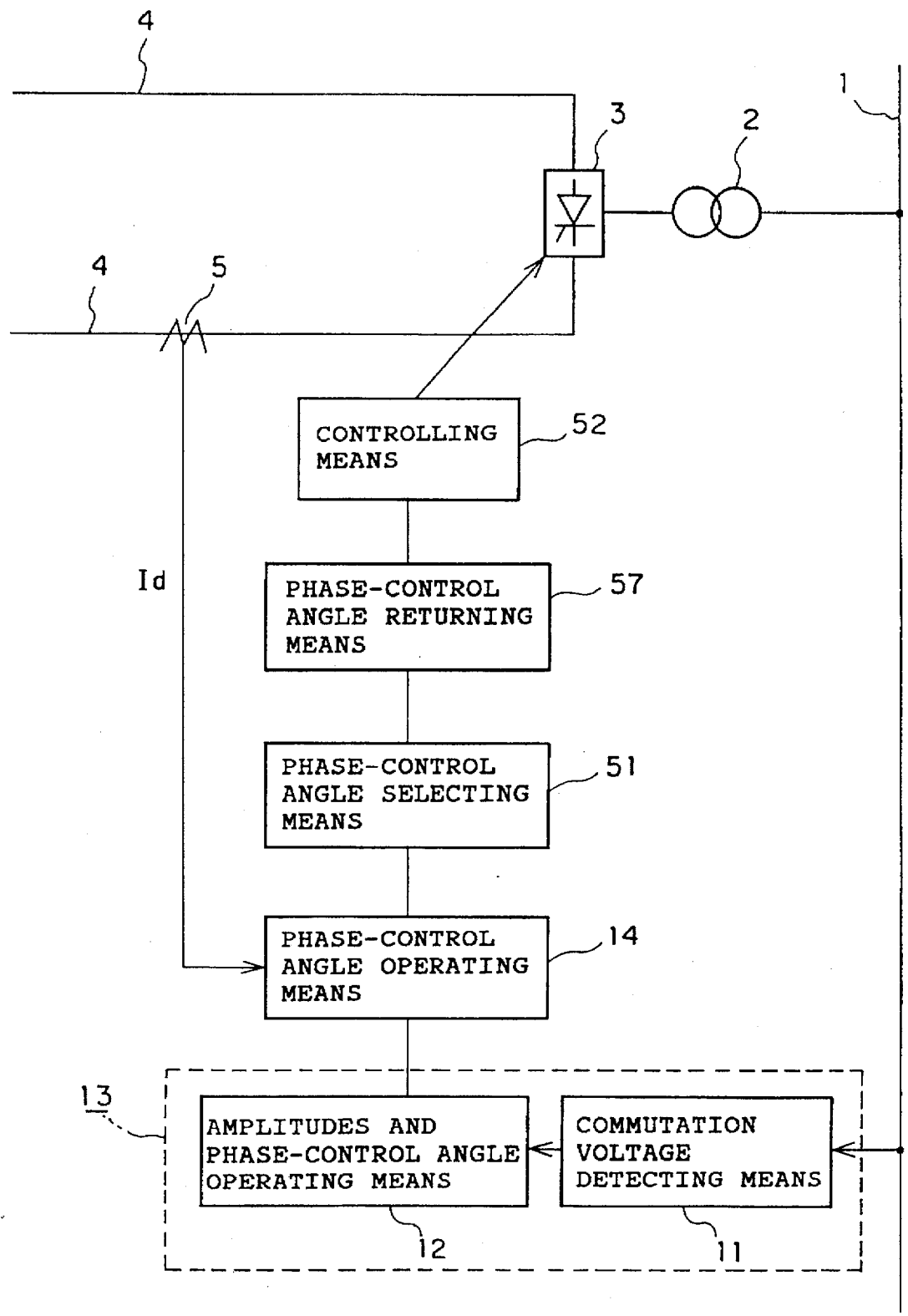
FIG. 11 is a block diagram showing a power converter controlling apparatus according to a sixth embodiment of the present invention.
Figure 12:
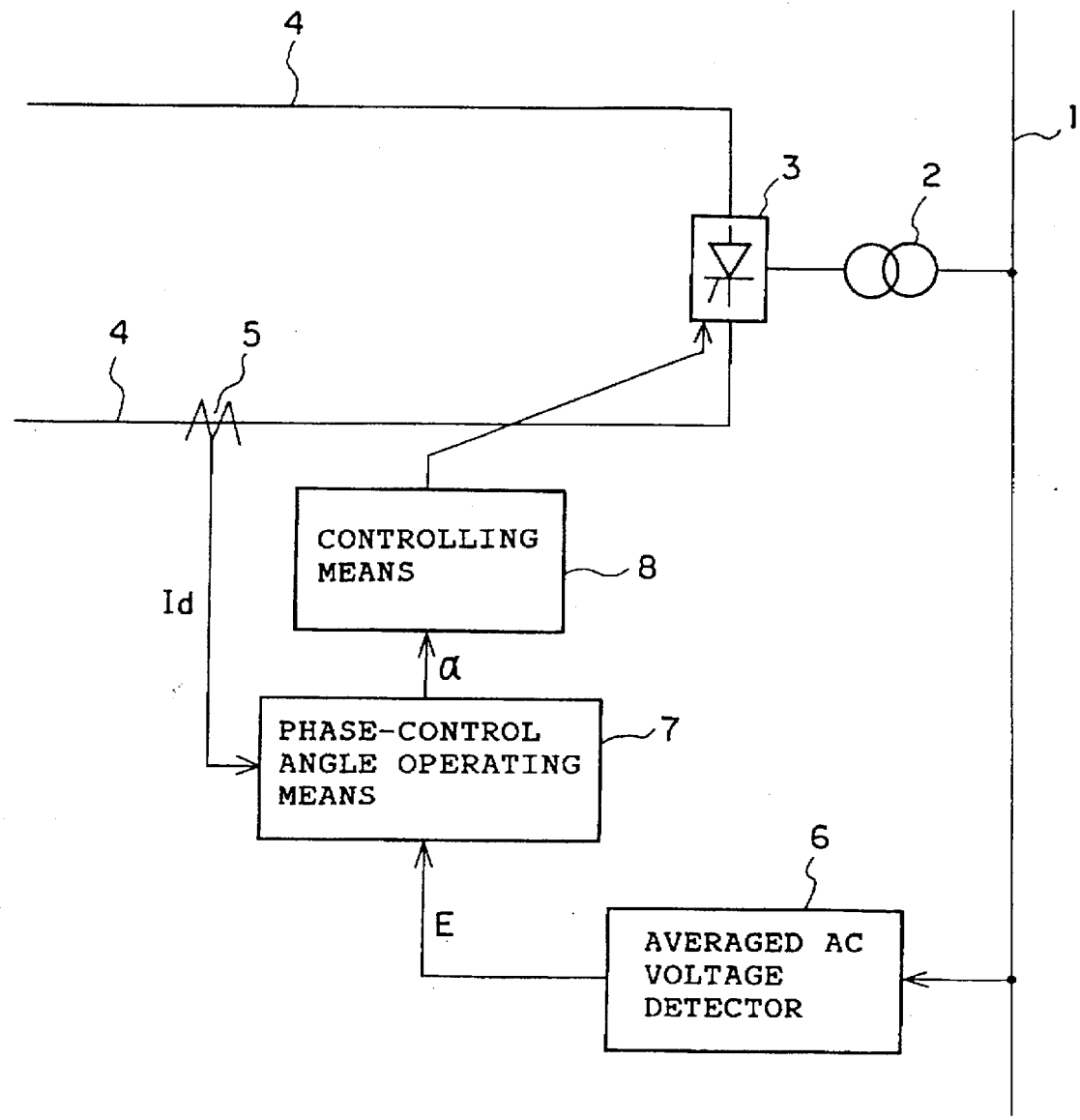
FIG. 12 is a block diagram showing a conventional power converter controlling apparatus.
Figure 14:
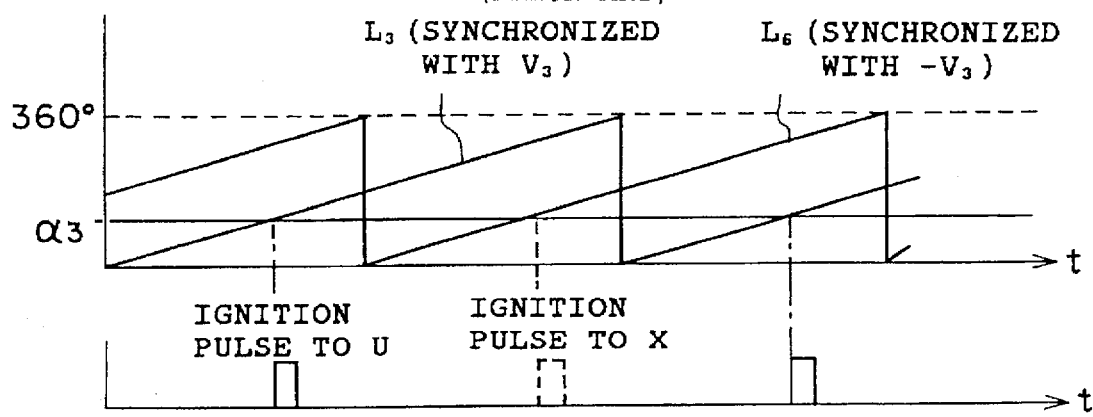
FIG. 14(a), FIG. 14(b) and FIG. 14(c) are drawings showing signal waves for illustrating the operation of the controlling means 8 of the conventional power converter controlling apparatus of FIG. 12.
Figure 14:
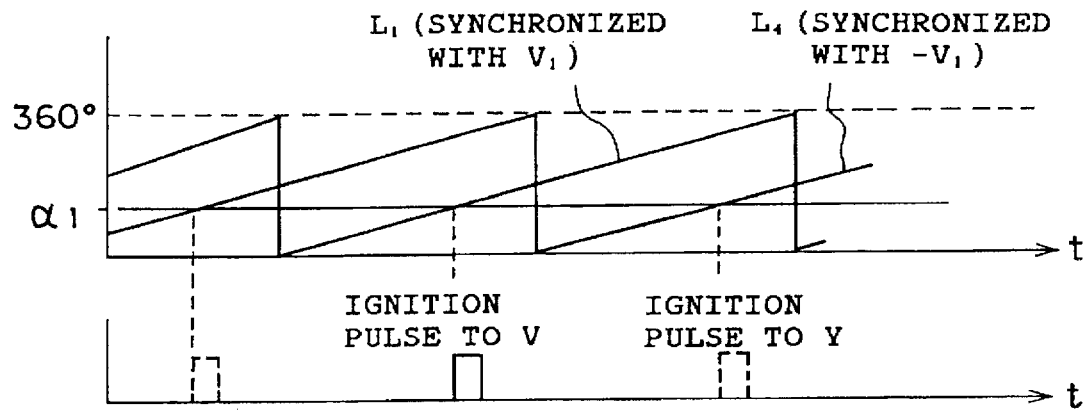
Figure 14:
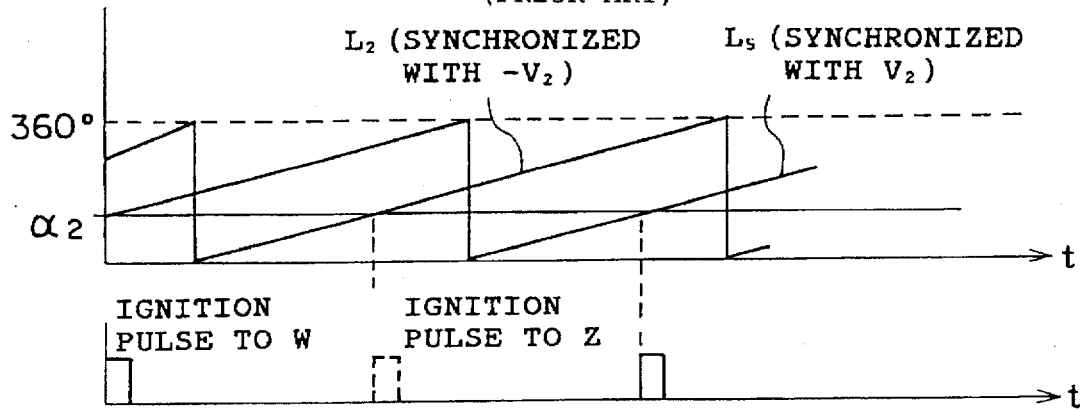

In the aforementioned embodiment 8, the power converter controlling apparatus compares the phase-control angles having been outputted by the phase-control angle operating means 14 with the phase-control angles returned by the phase-control angle returning means 67. But, as shown in FIG. 11, the power converter controlling apparatus may compare a phase-control angle selected by the phase-control angle selecting means 51 with a phase-control angle returned by the phase-control angle returning means 57 for obtaining the same effects as those of the aforementioned embodiment 8.

It will be appreciated from the foregoing description that, according to the first aspect of the present invention, the power converter controlling apparatus is constructed so as to output voltage signals different in phase from phases of commutation voltages of each switching device by 90 degrees to transform the voltage signals and the commutation voltages in conformity with polar coordinate transformation, and so as to output amplitudes of the commutation voltages and phase differences of the commutation voltages to a reference phase based on results of the transformation, and further so as to output phase-control angles of each switching device based on the amplitudes and the phase differences, and consequently, the amplitudes and the phase differences of commutation voltages having changed can be obtained without any delay in time from the changes. As a result of that, the effects that the failure of commutation of each switching device which occur at ac voltage changes by an accident or the like can be prevented and that appropriate electric power can always be transmitted are obtained.

Furthermore, according to the second aspect of the present invention, the power converter controlling apparatus is constructed so as to control each switching device on a phase-control angle having the smallest value among phase-control angles of each switching device operated by a second operating means, and consequently, the effect that each switching device can be controlled without the effluence of non-theoretical higher harmonics from a power converter to ac systems can be obtained in addition to the effects of the invention of claim 1.

Furthermore, according to the third aspect of the present invention, the power converter controlling apparatus is constructed so as to control each switching device on a phase-control angle selected by a first selecting means if higher harmonics detected by a higher harmonics detecting means are larger than a prescribed value, and so as to control each switching device on phase-control angles operated by a second operating means if the higher harmonics are not larger than the prescribed value, the effects that non-theoretical higher harmonics flowing out from a power converter to ac systems can be limited in a prescribed range and that a large amount of electric power can be transmitted within the range are obtained in addition to the effects of the invention of claim 1.

Furthermore, according to the fourth aspect of the present invention, the power converter controlling apparatus is constructed so as to control each switching device on a phase-control angle selected by a first selecting means if a switching signal output by a second selecting means indicates that each switching device should be controlled on the selected phase-control angle, and so as to control each switching device on phase-control angles outputted by a second operating means if the switching signal indicates that each switching device should be controlled based on the outputted phase-control angles, and consequently, the effect that it becomes possible to select either the prevention of the effluence of non-theoretical higher harmonics or the increase of the amount of transmission on demand is obtained in addition to the effects of the invention of claim 1.

Furthermore, according to the fifth aspect of the present invention, the power converter controlling apparatus is constructed so as to operate phase-control angles having been outputted by a second operating means and being returned at a prescribed delay time constant, and so as to compare the largeness of the returned phase-control angles with the largeness of the phase-control angles having been operated by the second operating means to output smaller ones to a controlling means, and consequently, the effect that the failure of commutation of each switching device can be prevented even in case voltages having changed by an accident or the like recover is obtained.

Furthermore, according to the sixth aspect of the present invention, the power converter controlling apparatus is constructed so as to output a phase-control angle having been selected by a first selecting means and being returned at a prescribed delay time constant and so as to compare the largeness of the returned phase-control angle with the largeness of the phase-control angle having been selected by the first selecting means to output smaller one to a controlling means, and consequently, the effect that the failure of commutation of each switching device can be prevented even when voltages having changed by an accident or the like recover is obtained.

While preferred embodiments of the present invention have been described using specific terms, such description is for illustrative purposes only, and it is to be understood that changes and variations may be made without departing from the spirit or scope of the following claims.

What is claimed is:

1. A power converter controlling apparatus comprising:

a commutation voltage detecting means for detecting commutation voltages of each switching device constituting a power converter and outputting said detected commutation voltages;

a first operating means for receiving said outputted commutation voltages, developing voltage signals different in phase by 90 degrees from said commutation voltages, and transforming said voltage signals and said received commutation voltages into polar coordinate form, thereby outputting amplitudes of said commutation voltages and phase differences of said commutation voltages with respect to a reference phase as a result of said transformation;

a second operating means for outputting phase-control angles of each switching device based on said amplitudes and said phase differences outputted by said first operating means; and a controlling means for controlling each switching device according to phase-control angles outputted by said second operating means.

2. The power converter controlling apparatus according to claim 1, which further comprises a phase-control angle returning means for outputting phase-control angles having been outputted by said second operating means and being returned at a prescribed delay time constant, said phase-control angle returning means comparing said returned phase-control angles with said phase-control angles having been outputted by said second operating means to output smaller ones to said controlling means.

3. A power converter controlling apparatus comprising:

a commutation voltage detecting means for detecting commutation voltages of each switching device constituting a power converter and outputting said detected commutation voltages;

a first operating means for receiving said outputted commutation voltages, developing voltage signals different in phase by 90 degrees from said commutation voltages and transforming said voltage signals and said received commutation voltages into polar coordinate form thereby outputting amplitudes of said commutation voltages and outputting phase differences of said commutation voltages with respect to a reference phase as a result of said transformation;

a second operating means for outputting phase-control angles of each switching device on said amplitudes and said phase differences outputted by said first operating means;

a first selecting means for selecting a phase-control angle having the smallest value among phase-control angles of each switching device outputted by said second operating means; and a controlling means for controlling each switching device based on said phase-control angle selected by said first selecting means.

4. The power converter controlling apparatus according to claim 3, which further comprises a second selecting means for outputting a switching signal to said controlling means; said controlling means controlling each switching device based on said phase-control angle selected by said first selecting means if said switching signal indicates that each switching device should be controlled based on said selected phase-control angle, and controlling each switching device based on phase-control angles outputted by said second operating means if said switching signal indicates that each switching device should be controlled based on said operated phase-control angles.

5. The power converter controlling apparatus according to claim 3, which further comprises a higher harmonics detecting means for detecting higher harmonics contained in an ac system; said controlling means controlling each switching device based on said phase-control angle selected by said first selecting means if said higher harmonics are larger than a prescribed value, and controlling each switching device on said phase-control angles outputted by said second operating means if said higher harmonics are not larger than said prescribed value.

6. The power converter controlling apparatus according to claim 3, which further comprises a phase-control angle returning means for outputting a phase-control angle having been selected by said first selecting means and being returned at a prescribed delay time constant, said phase-control returning means comparing said returned phase-control angle with said phase-control angle having been selected by said first selecting means to output smaller one to said controlling means.

* * * * *

UNITED STATES PATENT AND TRADEMARK OFFICE
CERTIFICATE OF CORRECTION

PATENT NO. : 5,717,583
DATED : February 10, 1998
INVENTOR(S) : Masamori Nobayashi et al.

It is certified that error appears in the above-indentified patent and that said Letters Patent is hereby corrected as shown below:

Col. 1, line 29, "a based" should be -- $\alpha$ based --; Col. 6, line 49, before "on results" insert -- based --; Col. 7, line 25, after "phase" insert -- $\theta$ --;
Col. 16, line 32, after "device" insert -- based --.

Signed and Sealed this

Sixth Day of April, 1999

Attest:

Q. TODD DICKINSON

*Attesting Officer*           *Acting Commissioner of Patents and Trademarks*